No. 821,411. PATENTED MAY 22, 1906.
P. P. G. HALL.
OYSTER DREDGING HOIST.
APPLICATION FILED DEC. 12, 1905.
2 SHEETS—SHEET 1.
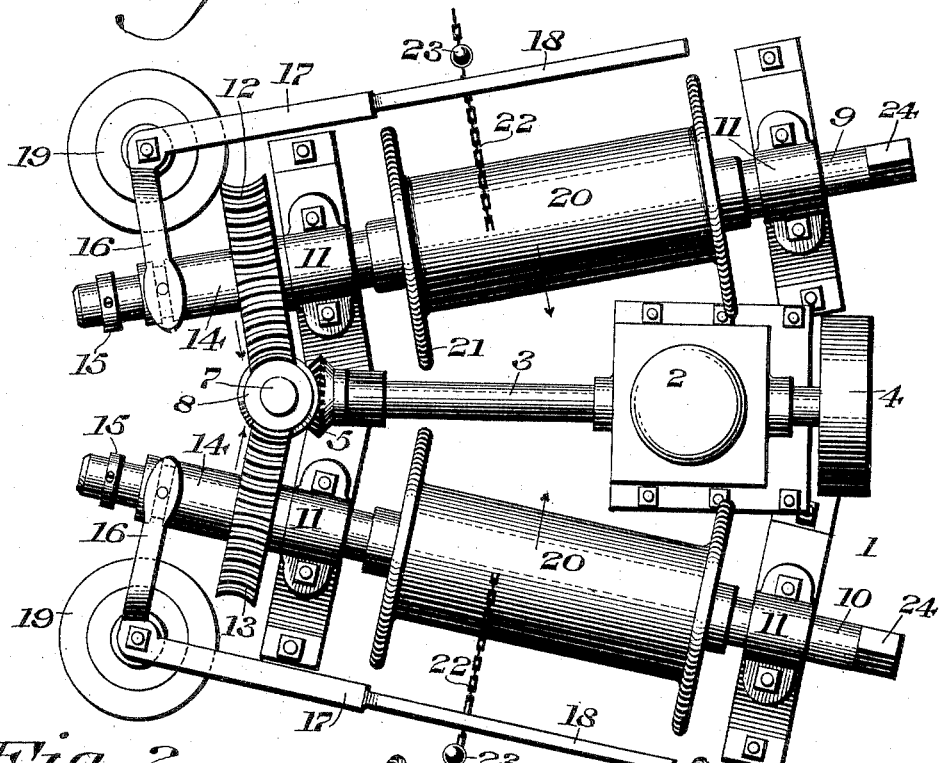
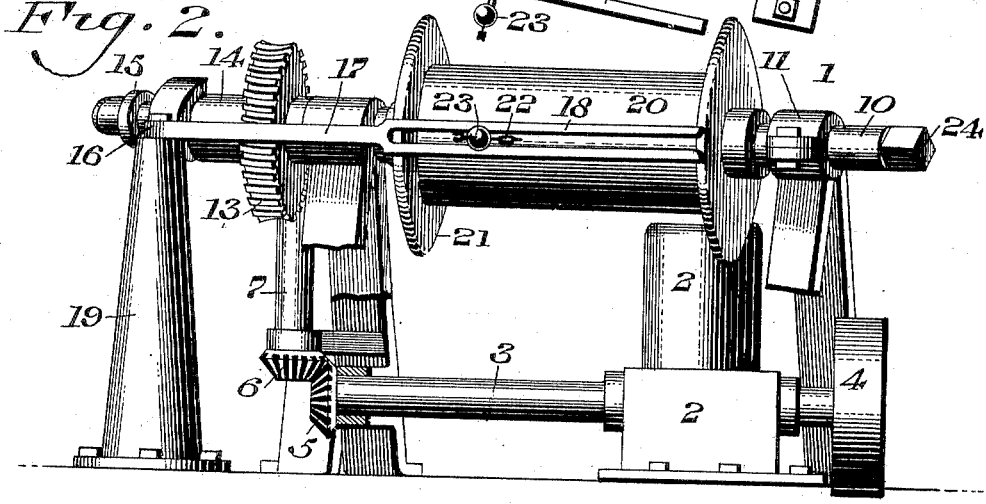
Witnesses
P. F. Nagle.
L. Douville.
Inventor
Peter P. G. Hall
By Biedersheim & Fairbanks
Attorneys No. 821,411. PATENTED MAY 22, 1906.
P. P. G. HALL.
OYSTER DREDGING HOIST.
APPLICATION FILED DEC. 12, 1905.
2 SHEETS—SHEET 2.
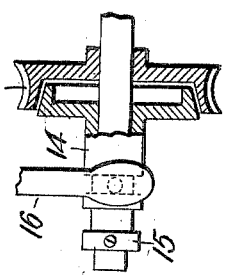
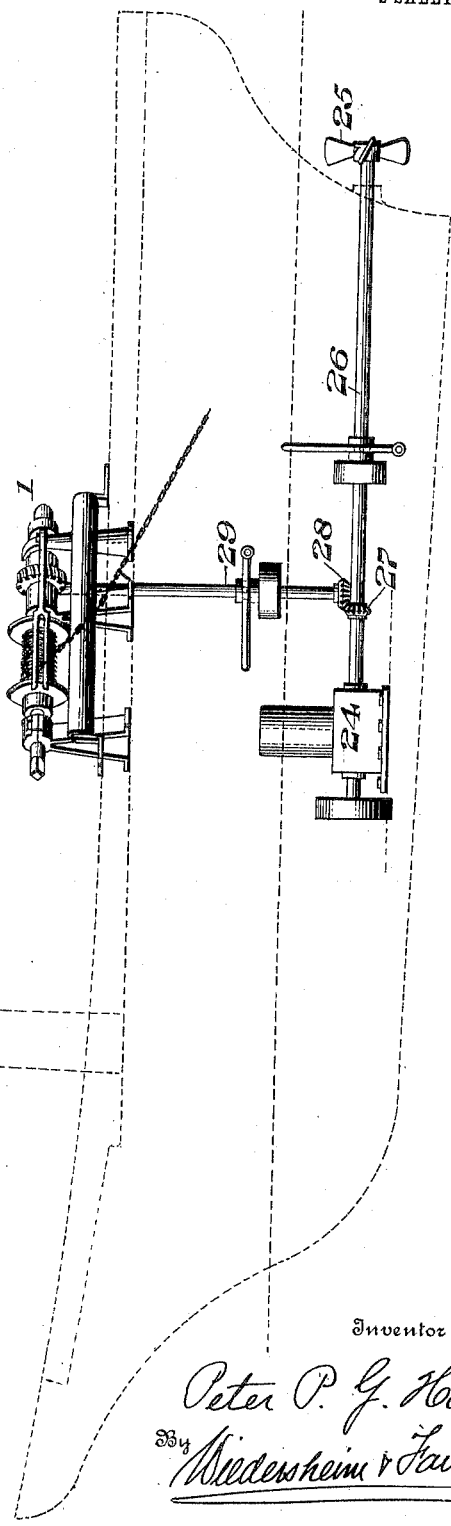
Witnesses
P. F. Nagle
L. Donville
Inventor
Peter P. G. Hall
By Wiedersheim & Fairbanks,
Attorneys

UNITED STATES PATENT OFFICE.

PETER P. G. HALL, OF PHILADELPHIA, PENNSYLVANIA.

OYSTER-DREDGING HOIST.

No. 821,411.    Specification of Letters Patent.    Patented May 22, 1906.

Application filed December 12, 1905. Serial No. 291,436.

*To all whom it may concern:*

Be it known that I, PETER P. G. HALL, a citizen of the United States, residing in the city and county of Philadelphia, State of Pennsylvania, have invented a new and useful Oyster-Dredging Hoist, of which the following is a specification.

My invention relates to a new and useful oyster-dredging hoist; and it consists of means whereby a plurality of dredges may be operated by a single means.

It further consists in means for automatically stopping the operation at a predetermined point.

It further consists of other novel details of construction, all as will be hereinafter fully set forth.

Figure 1 represents a plan view of an oyster-dredging hoist embodying my invention. Fig. 2 represents a side elevation thereof, showing parts broken away. Fig. 3 represents a side elevation of a hoist, showing outlines of a boat in dotted lines. Fig. 4 represents a partial sectional view and partial elevation of another portion of the device, showing a form of clutch which may be used.

Similar numerals of reference indicate corresponding parts in the figures.

Referring to the drawings, 1 designates an oyster-dredging hoist having an engine 2, which is provided with a shaft 3 and a balance-wheel 4. On the shaft 3 is provided miter or other gears 5, which are in mesh with a second gear 6, the latter being carried by a shaft 7, which is suitably supported and is provided with a worm 8 at a suitable point thereon.

9 and 10 designate shafts which are suitably supported in the frames 11, said shafts being held at an angle to each other, as will be understood from Fig. 1. Loosely mounted on the shafts 9 and 10 are gears 12 and 13, each of which mesh with the worm 8 and are driven thereby, said gears being provided with one member of a clutch, the movable members 14 of which clutch are keyed or otherwise in suitable connection with the said shafts 9 and 10, suitable stops 15 being provided on the shafts to prevent improper movement of said clutch members 14.

16 designates a lever which has an extending arm 17, the end of which is forked, as at 18, said lever being suitably pivoted on the support or standard 19.

20 designates drums which are mounted on the shafts 9 and 10 and which are provided with the rims 21, said drums being adapted to be connected therewith and receive the ropes or chains 22. In the figures I have shown only a portion of these chains for the sake of clearness; but it will be understood that these chains are connected at their outer ends with the oyster-dredges. (Not shown.) By reason of the arrangement of the parts it will be noted that the two drums 20 are rotated in the direction indicated by the arrow in Fig. 1, this resulting from the position of the gears 12 and 13 with respect to the worm 8, which causes the gears to rotate toward each other, the rotation of the drums 20 actuating the chains 22 in the same direction; thus causing the dredges to be drawn in at the proper time.

It will be further noted that the forked portion 18 of the arm 17 extends in front of the drums 20, and that the chain passes between the arms of the fork. At a suitable point in the chain I provide a stop or enlargement 23 for a purpose as hereinafter described.

The ends 24 of the shafts 9 and 10 are squared for the reception of a suitable handle or crank.

The operation of the device will be readily seen. When the engine 2 is in operation, it imparts motion to the shaft 3, which rotates the gear 5. This rotates the gear 6, and hence the shaft 7 and the worm 8, which rotates the gears 12 and 13, this being accomplished without imparting motion to the shafts 9 and 10 until the movable member 14 of the clutch is thrown into engagement with the clutch member on the gears 12 and 13. When the arms 17 are in the position seen in Fig. 1, the clutch member 14 will be in engagement with the clutch on the said gears, and motion will be thus imparted to the shafts 9 and 10, and consequently to the drums 20 thereon. This will cause the ropes or chains 22 to be wound thereon, drawing in the dredges, the stops 23 meanwhile having been placed at a suitable point on the chain at which it is desired to discontinue the movement of the chain, and when the stops 23 strike the forks 18 the same will be moved inwardly, thus moving the lever 16, which carries with it the movable member 14 of the clutch, so that the gears 12 and 13 will no longer impart motion to the shafts 9 and 10, and further movement of the dredges is prevented. As soon as the dredges have been emptied the same will be cast overboard again, carrying with them the chains 22, and the same will be unrolled from the drums 20. As the boat is in motion during the dredging, the chains 22 extend rearwardly from the boat, and hence the inclination to the shafts 9 and 10 is necessary in order to properly receive and discharge the chains from the drums. It will be further seen that by the construction above described and shown a single engine can be employed for operating both of the dredges, although, if desired, one or the other can be thrown out by proper manipulation of the clutches, and by reason of the squared ends on the shafts in case a breakdown should occur in the engine the drums can be operated by hand.

In the construction shown in Fig. 3 I have shown an engine 24, which is employed to operate the propeller 25, carried on the shaft 26, and I employ this same engine for operating the hoists, this being accomplished by mounting a gear 27 on the shaft, which will mesh with a gear 28, carried by a shaft 29, corresponding to the shaft 7, previously described, the other features being the same as already set forth.

It will be evident that various changes may be made by those skilled in the art which may come within the scope of my invention, and I do not, therefore, desire to be limited in every instance to the exact construction herein shown and described.

Having thus described my invention, what I claim as new, and desire to secure by Letters Patent, is—

1. In an oyster-dredging hoist, shafts supported at an angle to each other, gears loosely mounted thereon, means for connecting said gears with said shafts, drums carried by each of said shafts and single means to which motion is imparted engaging with said gears for rotating the same, the top of both drums turning toward each other.

2. In an oyster-dredging hoist, a plurality of shafts supported at an angle to each other, gears loosely mounted thereon, means for connecting said gears with said shafts and means for releasing said gears automatically.

3. In a device of the character described, shafts supported at an angle to each other, gears loosely mounted thereon, a worm meshing with said gears, means for imparting motion to said worm, clutches for causing said gears to be connected with said shafts and means suitably mounted with respect to said shafts and connected with the movable members of said clutches for throwing the same out of and into engagement.

4. In a device of the character described, shafts supported at an angle to each other, gears loosely mounted thereon, a worm meshing with said gears, means for imparting motion to said worm, clutches for causing said gears to be connected with said shaft and a forked arm suitably mounted with respect to said shafts and connected with the movable members of said clutch for throwing the same out of and into engagement.

5. In a device of the character described, shafts supported at an angle to each other, gears carried by said shafts, a worm meshing with said gears, clutch members adapted to connect said gears with said shafts, an engine adapted to impart motion to said worm, drums carried by said shafts, a forked arm situated in front of each of said drums and a chain adapted to pass between the arms of said fork and having a stop thereon for engagement with said arms.

6. In an oyster-dredging hoist, shafts suitably supported, gears loosely mounted thereon, means for connecting said gears with said shafts, drums carried by each of said shafts and single means to which motion is imparted engaging with said gears for rotating the same, the top of both drums turning toward each other.

7. In an oyster-dredging-hoist, a plurality of shafts suitably supported, gears loosely mounted thereon, means for connecting said gears with said shafts and means for releasing said shafts automatically.

PETER P. G. HALL.

Witnesses:
JOHN A. WIEDERSHEIM,
C. D. McVAY.